United States Patent [19]

Emery et al.

[11] 4,448,736
[45] May 15, 1984

[54] CONTINUOUS IN-LINE MELT FLOW RATE CONTROL SYSTEM

[75] Inventors: Donald B. Emery, Warrenville; William M. Herring, Elburn, both of Ill.

[73] Assignee: Standard Oil Company (Indiana), Chicago, Ill.

[21] Appl. No.: 381,048

[22] Filed: May 24, 1982

[51] Int. Cl.³ .............................................. B29F 3/06
[52] U.S. Cl. ...................................... 264/40.1; 264/40.7; 264/211; 264/349; 425/145; 425/149; 425/162; 425/170
[58] Field of Search .................... 264/40.7, 40.1, 40.3, 264/211, 349; 425/145, 149, 162, 163, 170

[56] References Cited

U.S. PATENT DOCUMENTS

| | | | |
|---|---|---|---|
| 3,148,231 | 9/1964 | Spencer | 264/40.7 |
| 3,248,469 | 4/1966 | Kosinsky | 425/146 |
| 3,499,952 | 3/1970 | Kolner et al. | 425/149 |
| 3,526,126 | 9/1970 | Wilchinsky et al. | 264/40.7 |
| 3,608,001 | 9/1971 | Kowalski et al. | 264/176 R |
| 3,718,414 | 2/1973 | Jones, Jr. | 425/146 |
| 3,728,056 | 4/1973 | Theysohn | 425/162 |
| 3,898,209 | 8/1975 | Watson et al. | 264/176 R |
| 4,209,476 | 6/1980 | Harris | 264/40.7 |
| 4,213,747 | 7/1980 | Friedrich | 425/144 |
| 4,233,255 | 11/1980 | Moon | 264/40.4 |
| 4,237,082 | 12/1980 | La Spisa | 264/40.7 |
| 4,244,897 | 1/1981 | Moon | 264/40.2 |
| 4,282,076 | 8/1981 | Boynton | 264/349 |

FOREIGN PATENT DOCUMENTS 2751225 5/1979 Fed. Rep. of Germany ...... 425/149

Primary Examiner—Jeffery R. Thurlow
Attorney, Agent, or Firm—Wallace L. Oliver; William T. McClain; William H. Magidson

[57] ABSTRACT

The continuous in-line melt flow rate control system (40; 100) is coupled to a mixer/extruder system (10; 97) including a polymer, stabilizer and degradent feeding system (12, 16, 18; 102) supplying mixed materials to the inlet end of an extruder (24; 108) having a die head (26) at the outlet end thereof. The control system (40; 100) is coupled between a rheometer (42; 112) which monitors a slip stream (46; 110) of melt from the extruder (24; 108) and a ratio controller (48; 93) in the feeding system (12, 16, 18; 102). The control system (40; 100) includes a rheometer (42; 112) which monitors the viscosity of the slip stream of melt from the extruder (24; 108) upstream from the die head (26) and converts the monitored viscosity value to a process signal (F) and a controller (44; 84; 101) that compares the process signal (F) with a set point value (A) related to a target melt flow rate and generates a correction signal (B, C, D) when there is a difference between the process signal (F) and the set point value (A). The correction signal (D) is supplied to the degradent ratio controller (48; 93) for adjusting the amount of degradent added to the polymer fed to the extruder (24; 108) in response to the deviation of the process signal (F) from the set point value (A).

25 Claims, 12 Drawing Figures

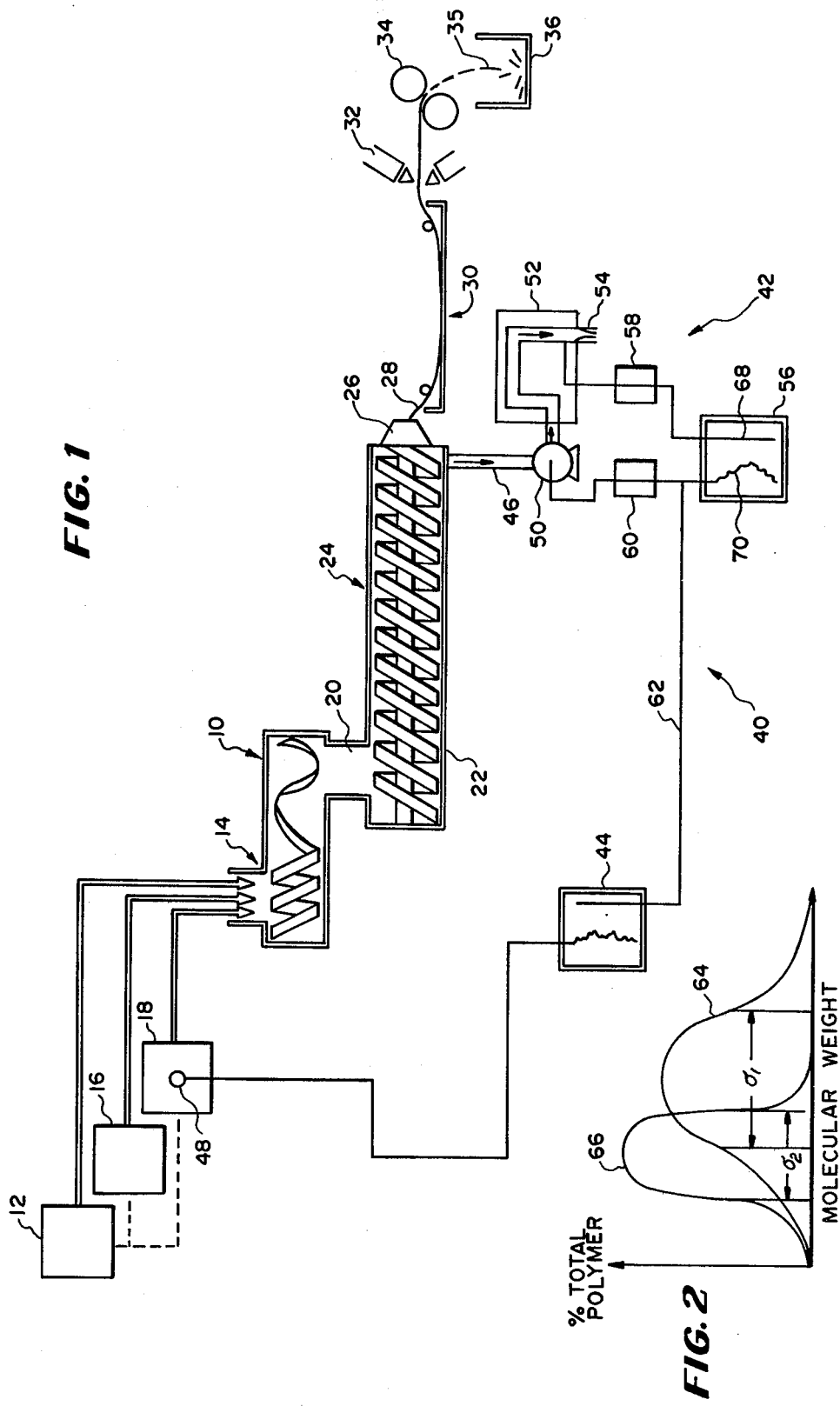

TASK 1

TASK 2

TASK 3

TASK 4

CONTINUOUS IN-LINE MELT FLOW RATE CONTROL SYSTEM

TECHNICAL FIELD

The present invention relates to a system for continuously controlling polymer molecular weight as measured by polymer melt flow rate for a polymer and degradent additive mixing and extruding system. More specifically, the present invention relates to a method and apparatus for automatically changing the amount of degradent added to a degradent-polymer mixture, e.g., of powder, pellets or melt, so as to maintain a substantially constant polymer molecular weight, as measured by polymer melt flow rate, as a die head at the outlet end of an extruder thereby to produce polymer, e.g., polypropylene, pellets of very uniform molecular weight.

BACKGROUND ART

The production of certain grades of polyolefins such as propylene polymers and polypropylene with desired distribution of molecular weights, or molecule chain lengths requires the addition of a chemical degradent such as a peroxide, to the polyolefin polymer. Typically, peroxide is added to the polyolefin in a mixing and extruding system in which the polymer is melted and extruded through a die head and strands of polyolefin from the die head are cut into pellets. The final molecular weight just upstream of the die head is very sensitive to the amount of chemical degradent added. As a result, during a typical production run, the plant operating personnel will submit line samples of pellets to a quality control laboratory for melt flow rate determination to measure polymer molecular weight. The results are usually available after the time of sample in from ½ to 2 hours.

If the results show a variation from the desired molecular weight, a change is made to the chemical degradent addition rate and the product sample is again sent for melt flow rate determination. This procedure is a time consuming process and can result in the generation of significant amounts of off-specification polyolefin products.

As will be described in greater detail hereinafter the present invention provides a method and apparatus wherein product melt flow rate is continuously monitored and adjusted on a timely basis which results in significantly less "off-spec" product being produced. Also, since a controller or computer is utilized, less manpower is required to ensure that a high grade polyolefin product is produced.

Heretofore various methods and apparatus have been proposed for controlling the molecular weight of an extruded polymer and for controlling the viscosity in a polymerization process. One example of a method and apparatus fo automatically controlling viscosity in a polymerization process is disclosed in Defensive Publication Ser. No. 723,407 published on Apr. 1, 1969. In this publication it is suggested that an analog computer be utilized for receiving a signal from a viscometer and then in response to the signal from the viscometer altering the position of a control valve controlling the flow of an additive to a polymer solution. In this publication it is noted that long time delays can result in overcontrol and it is suggested that the set point have a coarse adjustment and a fine adjustment.

It also has been proposed in U.S. Pat. No. 3,608,001 to control the conditions in an extruder reactor in response to a measured parameter, such as the melt flow in a slip stream supplied to a rheometer. Typically, the temperature in the extruder is controlled thereby to control the amount of gas degradation of the polypropylene.

In U.S. Pat. No. 3,898,209 there is disclosed a process for controlling the rheology of $C_3+$ polyolefins by controlling the quantity of oxygen injected into a melted polymer as it is being processed in an extruder.

Also, U.S. Pat. No. 4,213,747 discloses a method and apparatus for controlling the viscosity of molten plastic material by adjusting the position of a throttling element in the melt stream of plastic material, such as polypropylene, in response to changes sensed in the viscosity of the melt just upstream of a die head with a rheometer.

Further there is disclosed in U.S. Pat. No. 4,233,255 a method for controlling the thickness or weight of extruded stock by sensing the weight with a running weigh scale and then adjusting the feed rate of a conveyor conveying extrudate to the running weigh scale.

Moreover, a method and apparatus for controlling the density of products produced from an extrusion process are disclosed in U.S. Pat. No. 4,244,897. This is accomplished by sensing the density of a continuous sheet of foam material which is being coiled in a coil and when the density sensed is different from a target value density, a comparator causes adjustment of the amount of blowing agent supplied to the extruder and controls the amount of additive added to a resin that is supplied to the extruder for controlling the extrusion process.

As will be described in greater detail hereinafter, the method and apparatus of the present invention differ from these previously proposed methods and apparatus by providing a method and apparatus for controlling the molecular weight of an extruded polymer by altering, in a forward control manner, the mixture of degradent and polymer fed to an extruder relative to a target melt flow rate related to a desired polymer molecular weight. The apparatus is a continuous in-line control apparatus which includes process models and a dead time model for closely matching the actual process signal response derived from the change in viscosity of the melt in a slip stream supplied to a rheometer after a correction signal has been supplied for altering the ratio of degradent and polymer fed to the mixing and extruding system, thereby to prevent hunting and overcontrol which would otherwise be incurred as a result of a delayed or slowly changing melt flow rate response.

DISCLOSURE OF INVENTION

The present invention is directed to a system incorporating a continuous melt flow rate rheometer which is positioned to sample the melt from a slip stream just upstream of a die head in a pelletizing mixer/extruder system. A signal from the melt flow rate rheometer is compared with a target signal directly related to a desired polymer molecular weight or set point signal in a controller which is part of a closed loop system. The closed loop control system is operable upon sensing a difference to alter electronically controllable feeders and in one embodiment to alter a ratio controller for a degradent feeder which ratio controller is driven by a feed controller for the polymer feeder in a master-slave reationship thereby to maintain a desired polymer molecular weight of the extrudate.

In the following specification it is to be understood that "melt flow rate" is a polymer property defined as the amount of polymer (in grams) extruded over ten minutes using standard procedures and apparatus as defined in test method ASTM D 1238-79. This "melt flow rate" is commonly used as a measure used as a measure of molecular weight.

Also, polyolefins useful in practicing the method of this invention include polymers and copolymers of alpha-olefins containing two to about eight carbon atoms such as ethylene, propylene and butene-1. Typical polyolefins are ethylene and propylene polymers. Preferable polyolefins are a homopolymer of propylene (polypropylene) and copolymers of propylene containing minor amounts of other alpha-olefins such as ethylene.

Further, preferred peroxides useful as degradents in practicing the method of this invention include 2,5-dimethyl-2,5-bis-(t-butylperoxy) hexane, tradenamed Lubersol 101 by Pennwalt Chemicals; 2,5-dimethyl-2,5-bis-(t-butylperoxy) hexyne-3; dicumyl peroxide; alpha, alpha'-bis-(t-butylperoxy) diisopropylene benzene; and n-butyl-4,4-bis-(t-butylperoxy) valerate. Mixtures of peroxides can also be used, and the peroxide can be supported on inert carriers such as calcium carbonate. These peroxides are used in amounts sufficient to provide the desired increase in melt flow in the resinous polymer. Ordinarily, the amount of peroxide used can range from about 0.01 percent to about 5 percent by weight based on the resinous polymer. Preferably, the amount of peroxide would range from about 0.1 percent to about 2 percent by weight.

The material being extruded is typically a polyolefin typically a propylene polymer that is fed to a mixing system. Two additive feeders, one for a stabilizer and one for a degradent, or one additive feeder where the stabilizer and degradent are pre-blended, are driven by the ratio controller driven by the feed controller for the polymer feeder so that specified ratios of the additives are fed to the mixer/extruder system.

In one embodiment, polyolefin polymer with a stabilizer and degradent added thereto is melted and compounded in a continuous mixing system and then dropped into an extruder where it is extruded through a pelletizing die in the die head at the end of the extruder. Before the die head, a slip stream of melt is sent through heated pipes to a rheometer and the melt flow rate, namely melt viscosity, is sensed and converted to an output signal that is compared by a melt flow rate controller with a set point or target melt viscosity which is required to meet product melt flow rate specifications. Whenever there is a deviation from the melt flow rate specification, a correction in the feed rate of the degradent relative to the feed rate of the polypropylene is made automatically by the controller. This melt flow rate control system for controlling polymer molecular weight operates on a continuous basis and the closed loop control system is tuned to the characteristics of the process to include production rate and process dead time.

More specifically, according to the invention there is provided a method for controlling the molecular weight of a polymer being extruded through a die head at the outlet end of an extruder by altering, in a forward control manner, the mixture of degradent and polymer fed to the extruder relative to a target melt flow rate related to the molecular weight of polymer desired, said method comprising the steps of: monitoring the viscosity of a slip stream of melt from the extruder upstream from the die head; converting the monitored viscosity value to a process signal; comparing the process signal with a set point value related to a target melt flow rate; generating a correction signal where there is a difference between the process signal and the set point value; supplying said correction signal to a degradent additive feed control system for adjusting the amount of degradent added to the polymer fed to the extruder in response to the deviation of the process signal from the set point value; comparing the actual process signal with an approximated process model signal which includes at least one model for the process transition and a model for dead time; after the process transition and dead time periods have completely reacted to the correction signal, comparing the process signal with the set point value and if there is still a difference between the process signal and the set point value, generating a further correction signal and repeating the above thereby to maintain the melt flow rate as closely as possible to a target melt flow related to the desired polymer molecular weight.

Further, according to the invention, there is provided a method for continuously controlling the molecular weight of a polymer exiting a polymer mixing and extruding system by altering, in a forward control manner, the mixture of degradent and polymer fed to the extruder relative to a target melt flow rate related to the molecular weight of polymer desired, said method comprising the steps of: monitoring the viscosity of a slip stream of melt from an extruder upstream of an extruder die head with a rheometer having a positive pressure displacement pump; sensing a difference in the rheometer pump speed from the pump speed required to maintain a desired rate of flow of polymer at constant temperature and pressure through an orifice; altering the amount of degradent added to the polymer supplied to the mixing and extruding system in response to the sensed difference in speed of the pump; subsequently comparing the pump speed to the pump speed value required to maintain the desired rate of flow of the polymer at a constant temperature and pressure through an orifice after the altered ratio mixture of polymer and degradent has worked its way through the mixing and extruding system; and, if a difference in pump speed is sensed, repeating the above until the rate of flow of polymer at constant temperature and pressure through an orifice is substantially the desired rate of flow of polymer at constant temperature and pressure through an orifice related to the desired molecular weight of the polymer.

Also, according to the invention, there is provided an apparatus for controlling the molecular weight of a polymer being extruded through a die head at the outlet of an extruder by altering, in a forward control manner, the mixture of degradent and polymer fed to the extruder relative to a target melt flow rate related to the molecular weight of polymer desired, said apparatus comprising: means for monitoring the viscosity of a slip stream of melt from the extruder upstream of the die head; means for converting the monitored viscosity value to a process signal; means for comparing the process signal with a set point value related to a target melt flow rate; means for generating a correction signal when there is a difference between the process signal and the set point value; means for supplying said correction signal to a degradent additive feed control system for adjusting the amount of degradent added to the polymer fed to the extruder in response to the deviation of the process signal from the set point value; means for comparing the actual process signal with an approximated process model signal which includes at least one model for the process transition and a model for dead time; means for comparing the process signal with the set point value after the process transition and dead time periods have elapsed and a steady state condition has been reached, and if there is still a difference between the process signal and the set point value, said apparatus being operable to generate a further correction signal thereby to maintain the melt flow rate as close as possible to the target melt flow rate related to the desired polymer molecular weight.

Still further according to the invention there is provided an apparatus for continuously controlling the molecular weight of a polymer exiting a polymer mixing and extruding system by altering, in a forward control manner, the mixture of degradent and polymer fed to the extruder relative to a target melt flow rate related to the molecular weight of polymer desired, said apparatus comprising: means for monitoring the viscosity of a slip stream of melt from an extruder upstream of an extruder die head, said monitoring means including a rheometer having a positive pressure displacement pump; means for sensing a difference in the rheometer pump speed from the pump speed required to maintain a desired rate of flow of polymer at constant temperature and pressure through an orifice; means for altering the amount of degradent added to the polymer supplied to the mixing and extruding system in response to the sensed difference in speed of the pump and means for subsequently comparing the pump speed value required to maintain the desired rate of flow polymer at a constant temperature and pressure through an orifice after the altered ratio mixture of polymer and degradent has worked its way through the mixing and extruding system and for generating a correction signal if a difference in pump speed is sensed.

BRIEF DESCRIPTION OF THE DRAWINGS

FIG. 1 is a block schematic diagram of a continuous mixing and extruding system and a block symbolic diagram of a constant pressure rheometer and a continuous melt flow rate control system coupled to the mixing and extruding system.

FIG. 2 is a graph showing the standard deviation in molecular weight of polypropylene pellets produced by a mixing and extruding system and shows the standard deviation in molecular weight of a degraded polypropylene where, by controlling the melt flow rate, the standard deviation is held to a minimum thereby to provide a high quality grade of polypropylene.

BEST MODES FOR CARRYING OUT THE INVENTION

Figure 3:
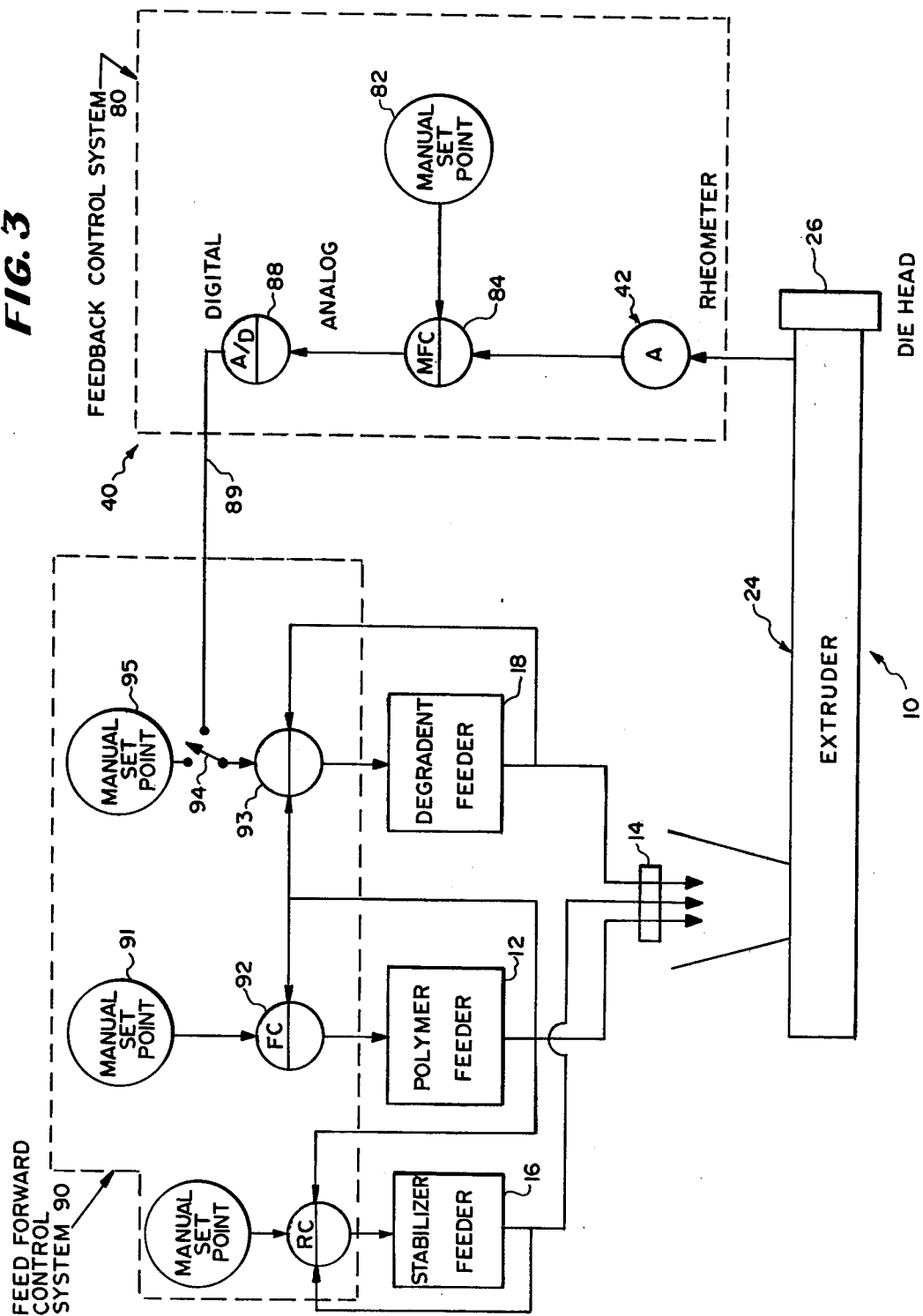
FIG. 3 is a schematic circuit diagram of a feed forward control system and a feedback control system for a mixing and extruding system.

In FIG. 1 is illustrated a feeder, mixer and extruder system 10 which includes a first feeder 12 for feeding polypropylene powder to a mixer 14. In addition to the feeder 12, there is a second feeder 16 for supplying a stabilizer additive to the mixer 14 to prevent random degradation of the polypropylene powder. The ratio of stabilizer to polypropylene is usually constant and can be premixed and fed by one feeder instead of the two feeders 12 and 16. Also, a degradent feeder 18 is provided for supplying a degradent, typically a peroxide, such as the peroxide sold under the trademark LUBERSOL 101 to the mixer 14. One example of a stabilizer is butylated hydroxy toluene (BHT). Of course, the polymer and additive can be fed in any other form such as in the form of pellets or melt rope instead of powder.

All the feeders 12, 16 and 18 are typically very accurate volumetric screw feed feeders such as the feeders sold under the trade mark K-tron by the K-tron Corporation of Glassboro, N.J.

The mixture of polypropylene, stabilizer and degradent powders in predetermined ratios is supplied to the mixer 14 which can be a continuous intensive mixer of the type made by The Japan Steel Works. Such a mixer includes twin sigma counter-rotating, nonintermeshing differential speed blades.

After the powders are mixed in the mixer 14, the mixture is fed to an inlet 20 of a barrel 22 of an extruder 24 which can be a Sterling TM extruder manufactured by the Sterling Extruder Corp. of South Plainfield, N.J.

In the extruder 24, the mixture of polypropylene, stabilizer and degradent is compressed and melted into polypropylene having an average molecular weight less than the molecular weight of the polypropylene powder feed. At the end of the extruder 24 is a die head 26 through which the mixed, melted and degraded polypropylene is extruded. The pressure just upstream of the die head 26 can approach 4000 psi and is typically between 2000 and 3000 psi. Typically, the strands or ribbons 28 exiting from the die head 26 are at a temperature of approximately 400° F.

The strands 28 are passed through a cooling water bath 30, past air strippers 32 and through a chopper 34 where the strands are cut into pellets 35 which are received in a bin 36.

It will be understood that the feeding, mixing and extruding system 10 shown in FIG. 1 can be modified if desired. In this respect, the continuous mixer 14 can consist of a mixer system including a first mixer of the type sold by the Rapids Machinery Co. of Marion, Ohio and known in the trade as a "Marion Mixer". The output from the Marion Mixer can then be supplied to a surge hopper and K-tron TM feeder. From there the premixed powders can be supplied to a Farrel Continuous Mixer TM (FCM TM) of the type sold by the Farrel Company of Ansonia, Conn. The output of the FCM TM is in the form of a melt rope which can be fed by a melt conveyor to the entrance end 20 of the extruder 24.

Also, instead of having the strands 28 of extruded polypropylene flow by gravity from the die head 26 into water bath 30, a pelletizer including a cooling water jacket can be mounted directly to the die head 26 of the extruder 24. Such a pelletizer can include a rotating cutter assembly located adjacent the outer die face and the water jacket surrounding same can have a lower water inlet and an upper water outlet. With this arrangement, the rotating cutter assembly will cut the strands 28 as they exit the die so to form pellets which are simultaneously cooled by the flow of water through the jacket and carried with the cooling water downstream to a screen where the pellets are separated from the water, dried and stored.

In accordance with the teachings of the present invention, a continuous in-line melt flow rate control systm 40 including a rheometer 42 and a controller 44 are coupled between an insulated conduit 46 coupled to the extruder barrel 22 just upstream of the die head 26 and a ratio controller 48 associated with the degradent feeder 18.

The rheometer 42 includes a positive displacement pump 50 for pumping a slip stream of the melt through the insulated conduit 46 into an insulated and heated rheometer housing 52 and through an outlet orifice 54. The rheometer 42 further includes a controller 56 coupled to a pressure sensor 58 that senses the pressure of the melt just before it exits through the outlet orifice 54. This controller 56 is also coupled to a tachometer or pump speed sensor 60 that senses the shaft speed of the pump 50.

The controller 56 is operable to maintain the pressure at orifice 54 constant while the temperature of the melt is maintained constant within + or $-0.1°$ F. As a result, a change in viscosity will cause a change in the speed sensed by sensor 60. A signal indicative of speed is supplied via line 62 to the controller 44 which is programmed to maintain the pump speed constant as shown, thereby to maintain a desired constant melt flow rate. The controller 44 accomplishes this by changing the ratio of degradent to polymer in the mixture in response to a change in the speed thereby to bring the melt flow rate and hence the pump speed back to the desired value.

As is known in the art, the melt flow through the orifice 54, which is sensed by sensing the pump speed, is indicative of the viscosity of the melted polypropylene mixture and the viscosity is directly related to the molecular weight of the polypropylene.

As will be described in greater detail hereinafter, the control system 40 is utilized to maintain the melt flow rate constant thereby to maintain the viscosity of the melt constant thereby to produce as uniform a grade of pellets of polypropylene as possible, i.e., pellets of polypropylene having a molecular weight or a molecular chain length within a limited tolerance range.

The polypropylene powder supplied to the feeder 12 has a random molecular weight or molecular chain length. In this respect, it has even been found that in one box of polypropylene powder from one batch, the molecular weight of the powder at different places in the box will vary.

By adding a degradent, a more uniform molecular weight polypropylene can be produced which will have more uniform and more desirable physical properties such as tensile strenth, elongation, impact strength, etc.

In FIG. 2 there is illustrated a bell shaped distribution curve 64 for the normal distribution of molecular weight of polypropylene having a standard deviation $\sigma_1$. It has been known that by adding a degradent and a stabilizer for enhancing controlled degradation, one can produce polypropylene pellets that have a molecular weight or molecule chain length within a very narrow standard deviation $\sigma_2$. However, heretofore it has been difficult to maintain a very narrow standard deviation $\sigma_2$ within very close limits because of the varying properties of the polypropylene powder that is fed to the extruder. In this respect, heretofore periodic samplings were taken from the slip stream conduit 46 and sent to a lab for analysis and then, if the analysis showed that the molecular weight was out of the desired range, more or less degradent was added to the mixer 14. This is time consuming and there is also a significant lag between the time an out-of-range condition is determined and then corrected. As a result, a lot of unuseable polypropylene pellets were heretofore manufactured which did not meet the purchaser's specifications.

With the control system 40 of the present invention the consistency in molecular weight or molecule chain length of the polypropylene pellets can be maintained within a very narrow standard deviation $\sigma_2$ so that most of the pellets produced fall within the area under the curve 66 for the standard deviation $\sigma_2$ shown in FIG. 2.

This is accomplished by maintaining a constant melt flow rate as defined by ASTM D 1238-79 and as measured by the flow of polymer out of the orifice 54 at a constant temperature, constant pressure and constant pump speed. As shown schematically in FIG. 1, this is done by first of all maintaining the pressure of the melt just before it exits through the outlet orifice 54 constant. This is shown by the line 68 in controller 56. This control is accomplished by adjusting the speed of the pump 50 as shown by the line 70 in the controller 56. Such a rheometer 42 with a pressure controller 56 is manufactured by the Seiscor Division of Seismograph Corporation of Tulsa, Okla. and is known as a Seiscor TM rheometer.

However, if one were to adjust the pump speed to maintain a constant pressure, indicated melt flow rate and viscosity would vary.

This, however, is prevented by the operation of the controller/computer 44 which can be a MACSYM 2 TM manufactured by Analog Devices, Inc. of Norwood, Mass. This computer 44 monitors the speed sensed by the sensor 60 and automatically adjusts the feed rate of degradent from the feeder 18 so as to maintain the speed of the pump 50 constant with the temperature and pressure being maintained constant by the controller 56. However, there must be compensation for the transient process response time and dead time, that is to say, the time it takes from the change of feed to the time there is a corresponding steady state correction of the melt flowing in the slip stream conduit 46.

In accordance with the teachings of the present invention and as will be described in greater detail hereinafter, an analog or digital model of the transient process response characteristic and of the dead time is supplied to the controller 44 so that once a change in feed rate is made, the controller 44 is caused to see an immediate response in the form of a process model response and a dead time model response and then after the process response to the change in feed rate is sensed by the speed sensor 60, the process response is compared to the model response. Then, if there is a difference, a further correction is made until the system 10 "lines out", i.e., reaches the desired steady state operating condition. This is described in further detail below for a control system in connection with the description of FIGS. 3, 4, 5 and 6.

Referring now to FIG. 3 there is illustrated therein the system 10 and the control system 40. Here the feeding, mixing and extruding system 10 includes the polymer feeder 12, stabilizer feeder 16 and degradent feeder 18. These feeders feed the materials to the mixer 14 from which it is delivered to the extruder 24 where the polypropylene is melted, degraded and then extruded through the die head 26.

A feedback control system 80 similar to controller 44 includes a manual set point 82 which is realized by a manual entry station. The melt flow rate set by the manual set point 82 is fed to a melt flow controller 84 having the rheometer 42 coupled to one input and an analog-to-digital (A/D) output circuit 88 coupled to an output thereof. An output 89 from the analog to digital output circuit 88 is fed to a feed forward control system 90.

The feed forward control system 90 determines the feed rate of the polymer and controls also the feed rate of degradent at a specified ratio to the polymer feed rate. This is accomplished by setting a manual set point 91 which is supplied to a feed controller 92 controlling the operation of the polymer feeder 12. This feed controller 92 is then coupled to a ratio controller 93 which controls the operation of the degradent feeder 18 as shown. A switch 94 is provided for coupling the ratio controller 93 to a degradent manual set point 95 for manual setting of the ratio controller 93 or to the output 89 for automatic operation of the feed forward system 90 by the feedback control system 80 where the output 89 is connected directly to controller 93. The set points 91 and 95 can be realized by digital thumbwheel switches.

If the polymer feed rate changes, the ratio controller 93 will automatically track the change to hold the ratio of the feeding of polymer and degradent constant thereby to minimize the effect of a change in polymer feed rate on product melt flow rate.

The feedback control system 80 compares the melt flow rate output signal from the rheometer 42 which can be in the form of melt flow rate or in the form of pump speed sensed by sensor 60.

Typically, the feeders 12 and 18 are positive displacement screw feeders with electronic controls. The feed rate is proportional to the screw rotational speed and the controls are electronically connected to permit the degradent feeder screw to be driven at a screw speed required to satisfy the desired degradent to polymer feed rate ratio.

In the feedback control system 80, the rheometer 42 measures the melt flow rate of a continuous sample of product taken from the slip stream conduit 46 immediately upstream of the extruder die head 26. The measured melt flow rate is compared to a target value in the melt flow controller 84 where the target value is established by the manual set point 82.

When the measured melt flow rate differs from the target value by a certain amount, the melt flow controller 84 generates an analog signal that is converted by the A/D converter 88 and supplied to the ratio controller 93 in the feed forward control system 90.

Figure 4:
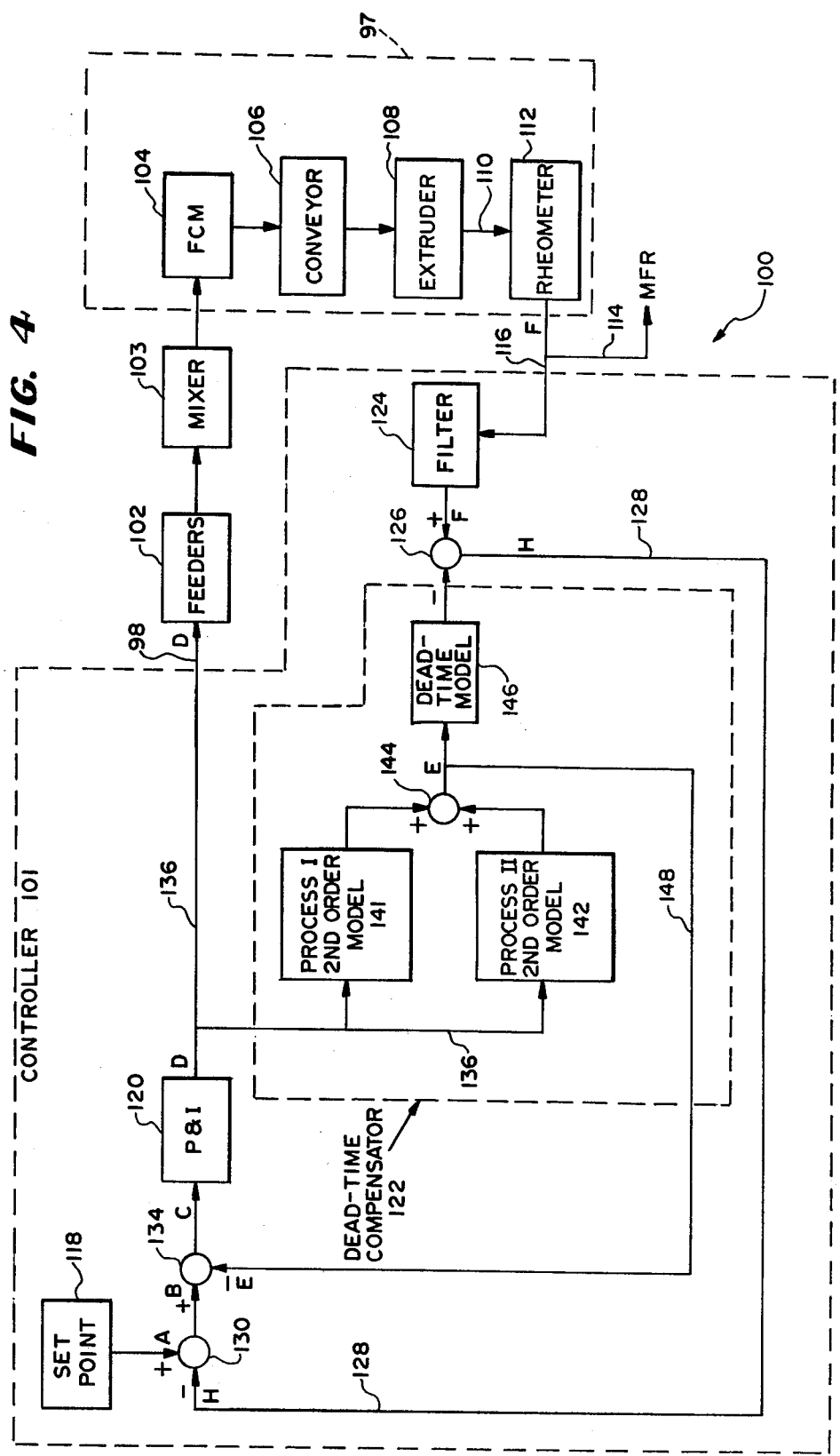
FIG. 4 is a block diagram of another mixing and extruding system employing two mixing stages and a schematic circuit diagram of a controller which is coupled to the system and which has process models and dead time models for approximating the actual melt flow rate response when there is a change in the amount of degradent mixed with polymer powder fed to the system.

Referring now to FIG. 4 there is illustrated therein a modified and somewhat more complex mixing and extruding system 97 which utilizes double mixing referred to above. In this respect, an output line 98 from a feedback control system 100 including a controller 101 is supplied to a ratio controller (not shown) in a set of feeders identified by reference numeral 102 which feed the materials to a first mixer 103 which can be a Marion Mixer TM. From there, the mixed materials are supplied to a second mixer 104 which can be a Farrel Continuous Mixer TM. From there a rope of polymer material is transported by a conveyor 106 to an extruder 108 having a slip stream 110 right behind the die head to which is connected a rheometer 112 such as a Seiscor TM rheometer.

The melt flow rate controller 101 of the control system 100 shown in FIG. 4 consists of two major sections that operate to generate the control signal at output 98 which is used to minimize the error between product measured melt flow rate 114 from the rheometer 112 and more specifically to minimize the error between the process output signal at rheometer output 116 supplied to the controller 101 and a target melt flow rate which is supplied to the controller 101 by a set point 118.

More specifically, the sections include a conventional proportional-plus-integral (P+I) process calculator 120 and a dead time compensator 122.

The signal path for the part of the controller 101 that represents the proportional-plus-integral process calculator 120 starts at the output line 116 from the rheometer 112 and passes through a filter 124 where spurious signals and signal variations caused by short-term perturbations of the measured melt flow rate are filtered out of the signal from the rheometer 112. The output from the filter 124 is then fed through a model comparator 126 and from there via a line 128 to one input of a set point comparator 130 which receives another input signal from the set point 118. The output of this comparator 130 is applied to one input of a set point/process/model comparator 134 the output of which is supplied to the P+I calculator 120. From there the signal path continues on a line 136 from the output of the P+I calculator 120 to output 98 of the control system 100.

Whenever there is an error signal, that is to say, when the signal on line 116 as filtered by the filter 124 differs from the set point signal from the set point 118, an error signal is generated. In other words, the process signal from the rheometer 112 passes through the model comparator 126 to the line 128 and to one input of the set point comparator 130 and is compared with the set point signal. The difference between them generates an error output signal from the set point comparator 130 which is supplied to the set point/process/model comparator 134 representing the difference between the filtered process signal and set point signal. This error signal is then passed through the P+I calculator 120 which processes the signal according to a conventional control equation and generates an output signal that is supplied via the line 136 to the output 98 to adjust the ratio controller from the feeders 102.

Since a time delay of up to 15 minutes, and sometimes up to 45 minutes or longer typically exists between the instant the ratio controller is adjusted to change the feed rate of the materials and the instant that the rheometer 112 begins to respond to the resulting change in product melt flow rate, that time delay is referred to as dead time.

Dead times of these orders of magnitude make automatic control of any process difficult if not impossible when using a conventional P+I calculator 120. However, by employing a dead time compensator, automatic control of the extruding process with appreciable dead times can be satisfactorily accomplished. For this purpose and according to the teachings of the present invention, the dead time compensator 122 is provided connected as shown.

The dead time compensator 122 includes a second order process I model 141 and a second order process II model 142. It has been found that when a double mixing system comprising a Marion Mixer TM 103 and a Farrel Continuous Mixer TM 104 is utilized, the response characteristic cannot be adequately replicated by using a single process model. However, it is to be understood that where a more simplified mixing system is utilized, such as the single mixer 14 shown in FIG. 1, only one process model may be necessary.

In addition to the process I model 141 and the process II model 142, the dead time compensator 122 includes a summing circuit 144 to which the outputs from the process models 141 and 142 are supplied and the sum or output from the summing circuit 144 is coupled by a line 148 back to an input of the set point/process/model comparator 134 and to an input of a dead time model 146. The output from the dead time model 146 is supplied to an input of the model comparator 126.

Figure 5:
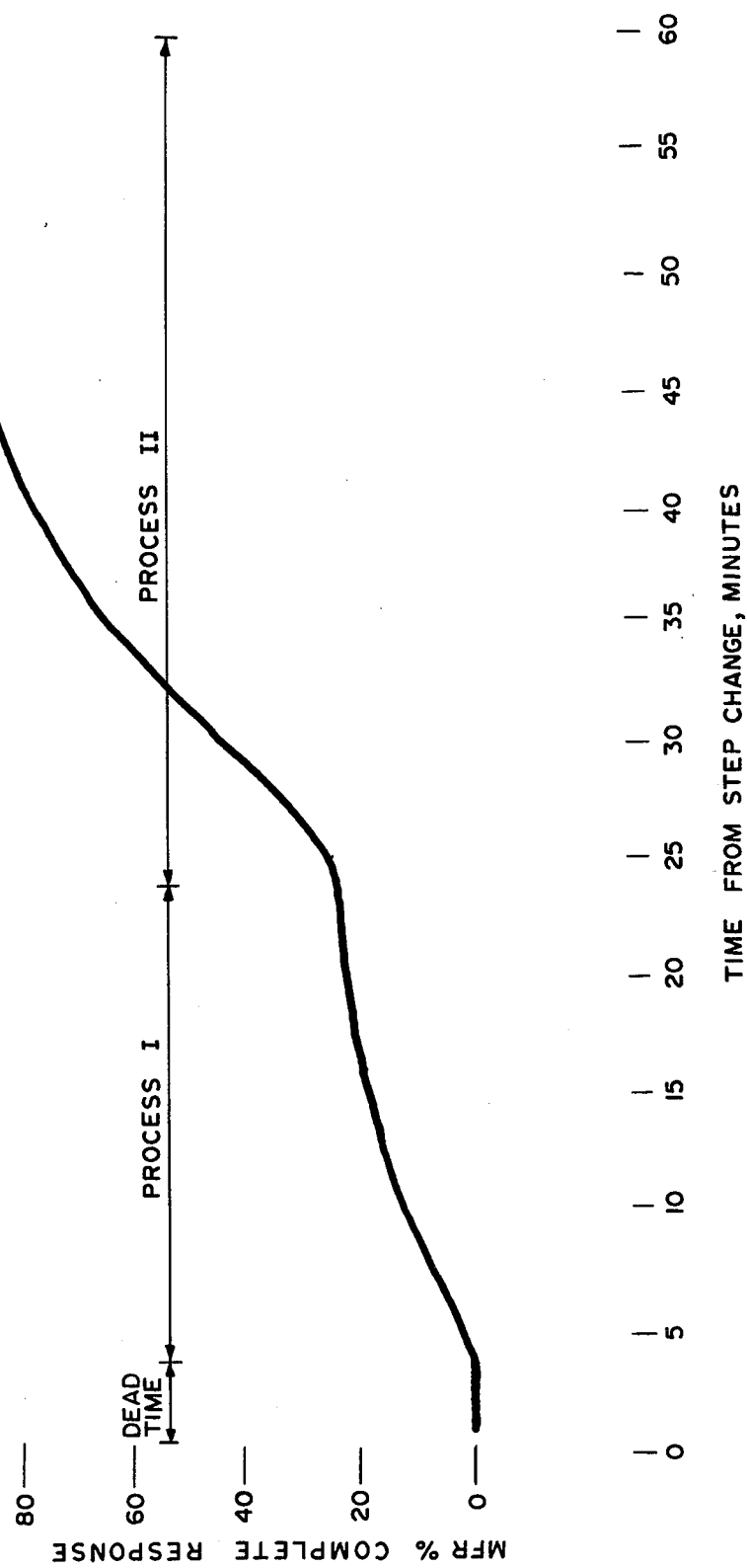
FIG. 5 is a graph of one example of the dead time model response and first and second process model responses established by the process models and dead time model shown in FIG. 4.

In FIG. 5 is illustrated the characteristics of the process I model 141 and the process II model 142. This combined model characteristic shown in FIG. 5 illustrates the manner in which the signal at the output 116 from the rheometer will vary when there is a step change in the set point of the ratio controller for the feeders 102.

The dead time compensator 122 operates as follows. First of all, the output signal generated by the P+I calculator 120 in addition to being applied to the output line 98 is also supplied to the two process models 141 and 142. Each of these process models process the P+I calculator 120 output signal according to equations that represent the melt flow rate response of the material leaving the mixer/extruder system to changes in the feed rate of the material. Again, two process models 141 and 142 are utilized in FIG. 4 because of the response characteristics of the double mixing and extruding system as shown in FIG. 5, and it is to be remembered that many controlled rheology systems display a response characteristic of a single process and need only a single process model.

The signals generated by the two process models 141 and 142 are summed in the summing circuit 144 to provide a signal at the output of the summing circuit 144 representative of the overall response of the controlled rheology system to variations in the melt flow rate of the polypropylene polymer material fed to the mixer 103 and/or to changes in the ratio of the materials fed to the mixer 103. This response signal which predicts the change in product melt flow rate caused by a change in the output signals on output 98 of the control system 100 is immediately "fed back" to the P+I calculator 120 on line 148 so that the P+I calculator 120 receives an immediate response to its control action. Thus, the P+I calculator 120 is effectively controlling the process without the detrimental intervention of dead time.

The summed response of the process models 141 and 142 by the summing circuit 144 is also supplied to the dead time model 146. Here the model response signal is processed by the dead time model 146 according to equations that represent the time delay or dead time associated with the response of the rheometer 112 to variations in the melt flow rate of the polypropylene polymer and/or to changes in the ratio of the materials fed by the feeders 102. Then, the signal generated at the output of the dead time model 146 represents the calculated real time change in product melt flow rate caused by a variation in the melt flow rate of the polypropylene polymer and/or to a change in the ratio of the materials fed.

This signal generated by the dead time compensator 122 is sent to the model comparator 126 for comparison with the filtered output signal from the rheometer 112. In this way, the calculated process model response signals are compared with actual process response signals on approximately the same time basis and the resultant signal from the model comparator 126 represents the non-ideality between the process models and the actual response.

The difference signal generated by this comparison i.e., the output of comparator 126, is sent to the set point comparator 130 via line 128 where it biases the set point 118 of the controller 101 to correct for the non-ideality between the actual response and the model response from the dead time compensator 122.

Although the components of the controller 101 are indicated as being electrical components, these components can also be pneumatic or other signal manipulating devices.

Moreover, as described above the melt flow controller 101 can be realized by a digital computer such as the MACSYM 2 TM computer 44. When the controller 101 is a digital computer, the components of the process models 141 and 142, dead time model 146 and P+I calculator 120 are implemented by computer software.

Additionally, the melt flow rate process signal can be represented by rheometer pump speed as described in connection with the description of the control system 40 in FIG. 1.

The various process models 141, 142, the dead time model 146 and the proportional-plus-integral calculator 120 and the manner in which these components are realized are well known in the art and are described in standard texts on process control. For example, reference is made to *Process Control Systems,* by F. G. Shinskey, published by McGraw-Hill Book Company, New York, 1967 and to *Digital Computer Process Control,* by Cecil L. Smith, published in 1972, by Intext Educational Publishers, New York, N.Y., the disclosures of which are incorporated herein by reference.

Figure 6:
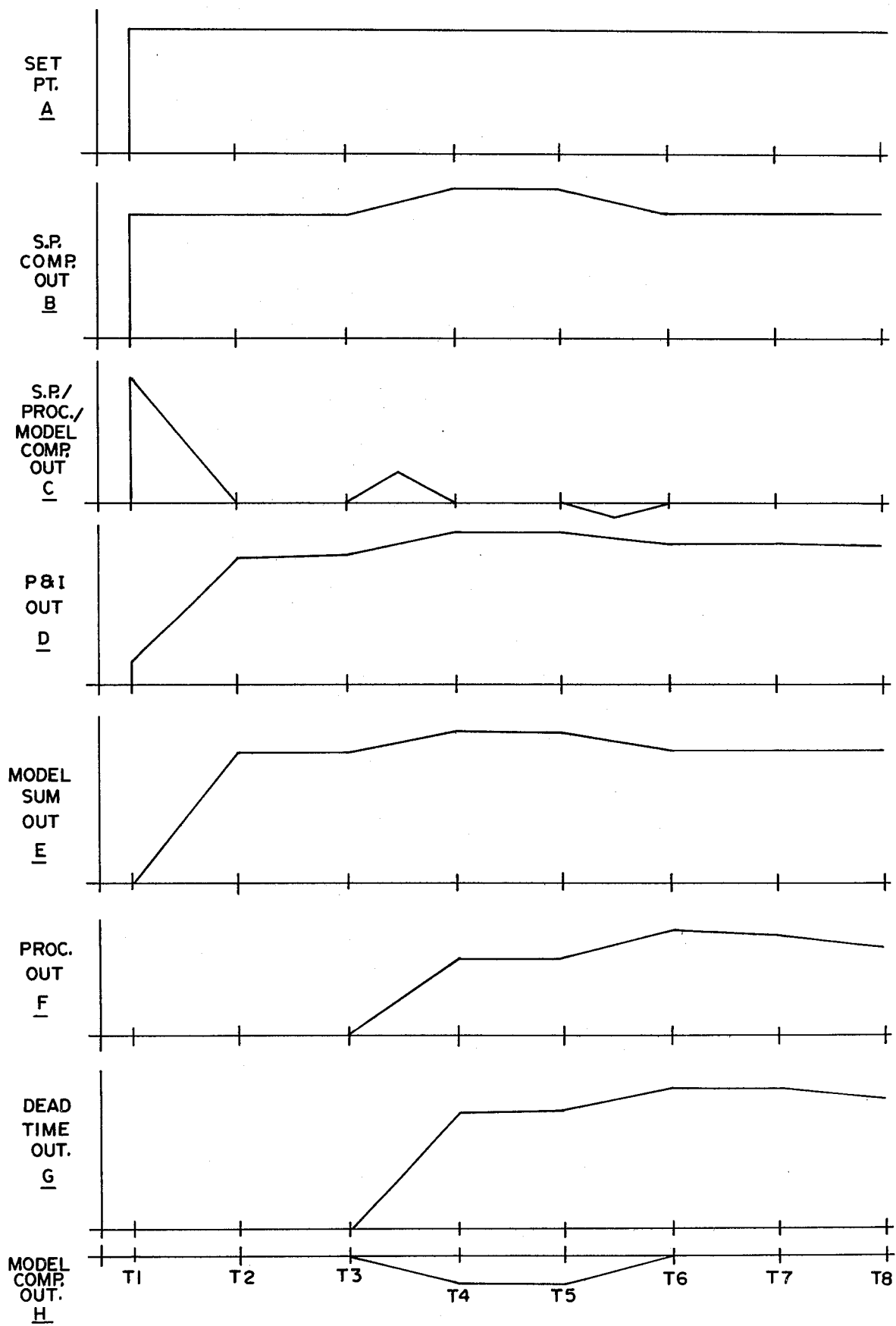
FIG. 6 is a simplified set of graphs of the signal levels versus time at different points in the circuit of the controller shown in FIG. 4 when the set point value is changed and the controller automatically changes the melt flow rate in the mixing and extruding system.

To show how the controller 101 operates in effecting a controlled change of melt flow rate, reference is now made to FIG. 6 which shows eight graphs of signals in different portions of the controller 101 circuit shown in FIG. 4 and these points are identified by reference letters A through H. The graphs show the various signal values at different times T1 through T8.

The signals are identified as follows, it being observed that the letter identification for each signal appears at the point in the circuit diagram shown in FIG. 4 where the signal occurs.

The signal A is the set point signal from the set point 118. The signal B is the set point comparator 130 output signal. The signal C is the set point/process/model comparator 134 output. The signal D is the P+I calculator 120 output signal. The signal E is the output of the model summing circuit 144. The signal F is the rheometer output signal from the rheometer 112 as filtered by the filter 124. The signal G is the output signal from the dead time model 146, and the signal H is the output signal from the model comparator 126.

It is to be understood that these signal levels are signals that would appear at the different points identified by letters in the controller 101 when there is a change in the feed ratio of the polypropylene polymer and degradent by the feeders 102 for a continuous mixer/extruder system 97 such as a Farrel Continuous Mixer TM /extruder system.

The diagram of the various signal levels A–H shown in FIG. 6 are simplified and the signal and time axes are not meant to be to scale. Also, the relative signal amplitudes are only approximate and changes in amplitude that are shown as straight lines may actually be curved lines, such as shown for the process response in FIG. 5.

In any event, at time 0, the system is operating as desired and is "lined out". As a result, signals A through H are steady and not changing. At time T1 the set point 118 is operated to make a step increase and this is immediately shown in the graph of signal A. After the step increase, the set point signal A remains at steady state. The set point comparator 130 output signal B also makes the step increase and then remains at steady state until time T3. This is because signal H, the model comparator 126 output signal, does not change until time T3.

As shown, the output signal C from the set point/process/model comparator 134 makes a step increase and then gradually recedes to 0 value at time T2 as a result of signal E, the output from the model summing circuit 144, increasing in response to signal D.

Signal D, the output signal from the P+I calculator 120, promptly makes a step increase due to the proportional term of the P+I calculator 120 and then continues to gradually increase due to the integral term of the P+I calculator 120 until time T2. Signal E, which is the process model signal representative of the melt flow rate response, changes in response to the signal D and gradually increases until time T2.

As shown, signals F, G, and H do not change until time T3 because the mixer/extruder system 97 dead time and the dead time model delay in model 146 delay the effects of signals D and E until time T3.

At time T2, the output signal D of the P+I calculator 120 lines out and the value of signal D from time T1 to time T3 moves through the mixer system. However, because of the system dead time, these signals do not yet affect signal F. Signal E from time T1 to time T3 is delayed by the dead time model 146 and does not affect signal G. Also, since signals F and G have remained constant, signal H is not affected from time T1 to time T3.

At time T3 the dead time has elapsed and for simplicity it is assumed that the dead time model precisely represents the dead time through the mixer/extruder system 97. Also, for illustration purposes, it is assumed that the process models do not exactly represent the response of the mixer/extruder system 97.

As shown, signal F, the process output signal from the rheometer 112, changes due to the change in the ratio of the feeding of materials by the feeders 102. At the same time, signal G, the output from the dead time model 146, starts to change in response to the signal E between times T1 and T2.

Signal H changes in response to the difference between the process response signal F and the model response signal G.

Then, of course, signal B, the output of the set point comparator 130 starts to change in response to the input of signal H thereto. Then, the output signal C from the set point/process/model comparator 134 begins to change in response to the change in signal B. However, since signal E is also changing, the response of signal C tends to be returned to 0 as shown.

Signal D, the P+I calculator 120 output signal, begins to increase as signal C, the input signal thereto, increases. However, unlike signal C, signal B continues to increase until time T4 due to the integral term of the P+I calculator 120.

At time T4, the effect of changes in signal D and signal E that occurred between times T1 and T2 has completely worked its way through the mixer/extruder system 97 and through the dead time model 146. Thus, at this time T4, signal F and signal G have lined out. As a result, signals H and B have lined out resulting in signals C, D and E being lined out.

At time T5, the dead time in the mixer/extruder system 97 output signal F follows the change in signal D beginning at time T3. The model dead time, signal G, follows the similar change in the model output signal E. Thus, signal F begins to respond to the changes that occurred in signal D between times T3 and T4. Signal G begins to respond to the changes that occurred in signal E between times T3 and T4. As a result, signal H begins to respond to the decreased difference between signals F and G by approaching 0. Signal B, the set point comparator 130 output signal, begins to respond to the change in signal H. Also, signal C begins to respond to the change in signal B but because signal E also is changing, the response of signal C tends to be returned to 0.

Signal D begins to change as signal C changes. However, unlike signal C, signal D continues to change due to the integral term of the P+I calculator 120. Note that the magnitude of change of signal B is less between times T5 and T6 than it was between times T3 and T4, and the magnitude of signal D between times T3 and T4 is less than what it was between times T1 and T2. This shows how the overall system approaches a new steady state condition.

At the same time, signal E responds to a change in signal D and gradually changes until time T6.

At time T6, the effect of changes in signal D and signal E that occurred between times T3 and T4 have completely worked their way through the mixer/extruder system 97 and through the dead time model 146. Thus, signal F and signal G have lined out at time T6 and as a result, signals H, B, C, D, and E are also lined out.

At time T7, the mixer/extruder system 97 dead time following the change in signal D beginning at time T5 and the model dead time following the similar change in signal E at time T5 begins to be noticed. In this respect, signal F begins to respond to changes that occurred in signal D between times T5 and T6. Likewise, signal G begins to respond to the changes that occurred in signal E between times T5 and T6. For this example it is assumed that the signal levels for signal F and signal G are now the same so that signal H remains a 0 and as a result, there are no further changes in signals B, C, D and E.

At time T8, all signals in the system are lined out and are at steady state.

The number of signal-changing cycles that follow a set point change before the system lines out depends on the closeness with which the process models 141 and 142 and the dead time model 146 actually represent the real process response which will occur at the output of the rheometer 112, i.e., signal F.

Also it is to be noted that a similar signal vs. time analysis for the signals at different points in the controller 101 circuit can be made for a change in feed polymer melt flow rate or some other process upset. In such a case, the signal F would be the first signal to change and this will cause a change in the set point comparator 130 output signal B which compares signal A with signal F.

FIGS. 7-12 depict flow charts of the protocol, procedures or routines performed by a computer/controller in operating the continuous in-line melt flow rate control system of the present invention.

Figure 7:
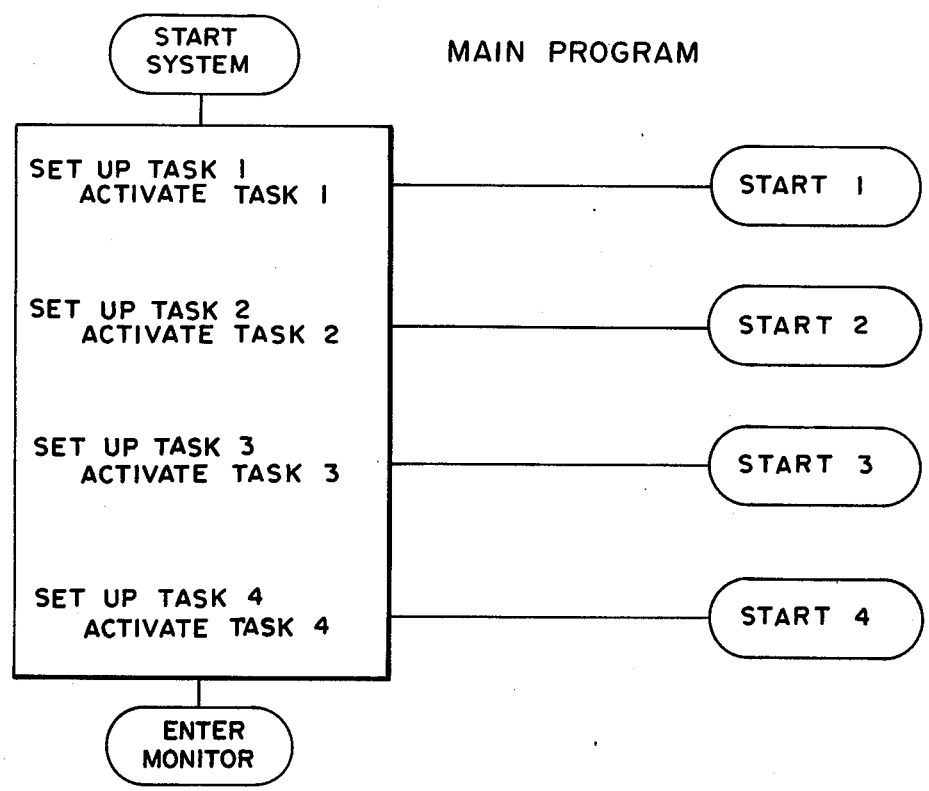
FIG. 7 is a flow chart of the main program for operating the controller (computer) shown in FIG. 4.
Figure 8:
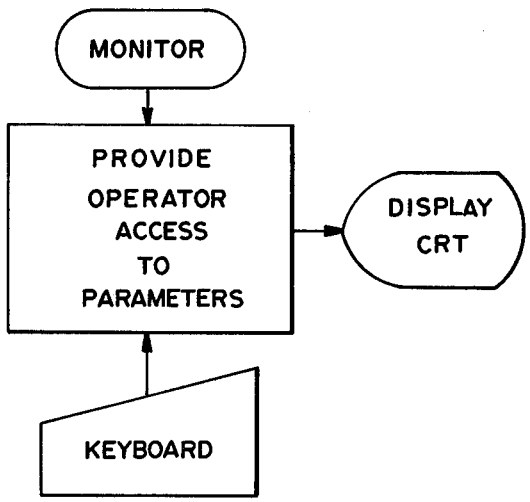
FIG. 8 is a flow chart illustrating the monitor status of the computer whereby an operator can access the computer via a keyboard and data can be displayed on a CRT.

As shown in FIG. 7, the first step is to start up the system and set up and activate Tasks 1, 2, 3 and 4, described further in connection with the description of FIGS. 9-12, after which the computer is in the monitor state.

As shown in FIG. 7, in the monitor state, the operator has access to parameters which can be displayed on a CRT. The operator input to the computer is through a keyboard as shown.

Figure 9:
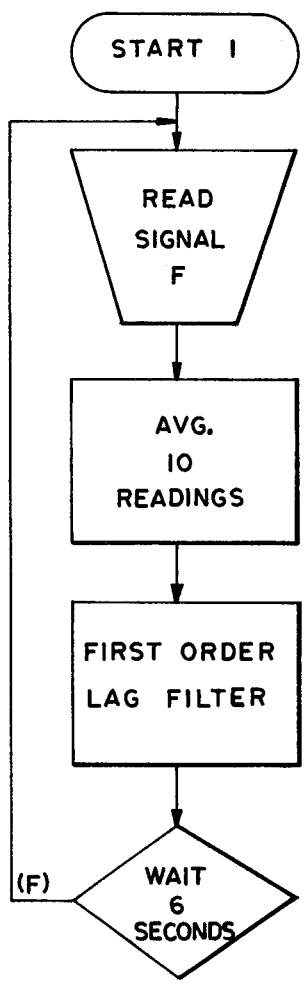
FIG. 9 is a flow chart of Task 1 of the main program shown in FIG. 7.

The first Task 1 is shown in FIG. 9 and involves the steps of (1) reading the output signal F from the rheometer 112, (2) averaging 10 readings, and (3) passing the average through a first order lag filter, e.g., filter 124. After these steps, the computer waits 6 seconds and repeats Task 1 thereby to update the signal F every 6 seconds.

Figure 10:
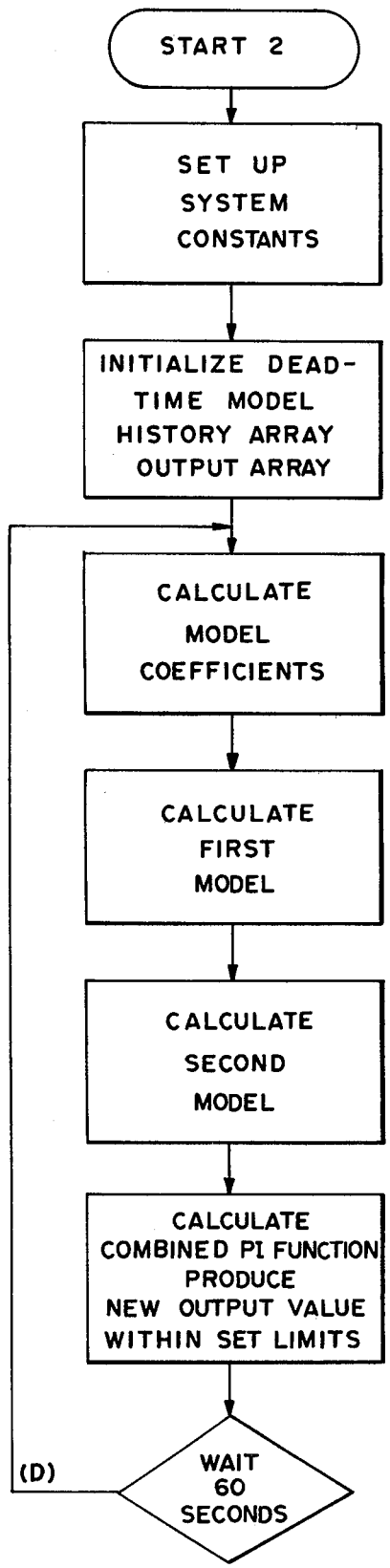
FIG. 10 is a flow chart of Task 2 of the main program shown in FIG. 7.

The flow chart for Task 2 is shown in FIG. 10 and includes setting up the system constants and initializing the dead time model, a history array and an output array. Then the model coefficients are calculated followed by calculation of the first model and the second model. Next the combined P+I function is calculated to produce new output values within set limits. The computer then waits for 60 seconds before updating the process models, the P+I function and the coefficients.

Figure 11:
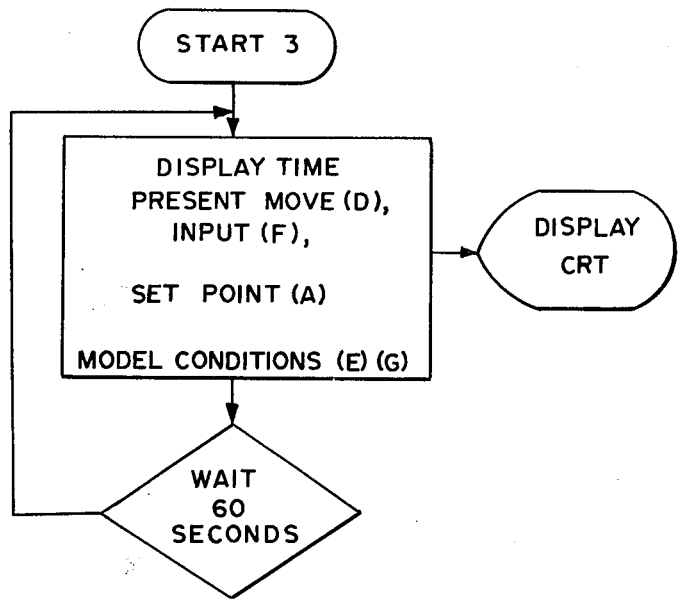
FIG. 11 is a flow chart of Task 3 of the main program shown in FIG. 7.

Task 3 is shown in FIG. 11 and includes the steps of displaying the time, the present move, i.e., the value of signal D, the set point signal A value and the model conditions, i.e., the values of signals E and G. The computer waits 60 seconds and then updates and displays these values as shown.

Figure 12:
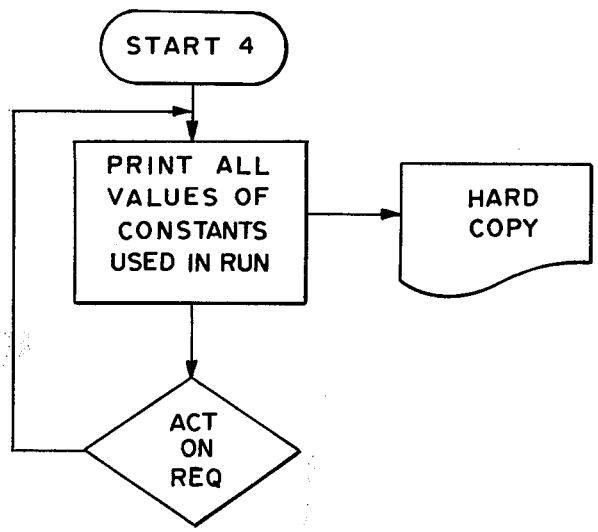
FIG. 12 is a flow chart of Task 4 of the main program shown in FIG. 7.

For Task 4 shown in FIG. 12, an "Act on Request" command is generated manually to cause a print to be made of all the values of constants used for the specific process operation by a printer to obtain a hard copy of the values.

The computer/controller will respond continuously to changes in the melt flow rate in the manner described above and alter the feed ratio to maintain a substantially constant melt flow rate thereby to produce polypropylene pellets to specification.

The computer can be programmed with the following two-process algorithm developed for a Farrel Continuous Mixer ™ and extruder system.

$$\Delta m_n = K_c[R_n - R_{n-1} - \hat{C}1_n + \hat{C}1_{n-1} + \hat{C}2_n - \hat{C}2_{n-1} - C_n + C_{n-1}] + (K_c T/T_i)[R_n - \hat{C}1_n + \hat{C}2_n - C_n]$$

$m_n$ = Controller Output
$R_n$ = Set Point
$C_n$ = Process Signal
$K_c$ = Controller Gain
$T_i$ = Controller Integral Time
$T$ = Sample Time $$\hat{C}1_n = \hat{c}1_{In} + \hat{c}1_{IIn}$$

$$c1_{In} = a_{1I}c1_{In-1} - a_{2I}c1_{In-2} + G_I(b_{1I}m_{n-1} + b_{2I}m_{n-2})$$

$$a_{1I} = e^{-T/\tau 1_I} + e^{-T/\tau 2_I}$$

$$a_{2I} = e^{-T/\tau 1_I} \cdot e^{-T/\tau 2_I}$$

$\tau 1_I, \tau 2_I$ = Time Constants, Process I;
$G_I$ = Process I Gain $$b_{1I} = (\tau 2_I - \tau 1_I + \tau 1_I e^{-T/\tau 1_I} - T 2_I e^{-T/\tau 2_I})/(\tau 2_I - \tau 1_I)$$

$$b_{2I} = (((T 2_I - T 1_I)e^{-T/\tau 1_I} \cdot e^{-T/\tau 2_I}) + \tau 1_I e^{-T/\tau 2_I} - \tau 2_I \cdot e^{-T/\tau 1_I})/(\tau 2_I - \tau 1_I)$$

$$m_{n-1} = m_n - \Delta m_n$$

$$m_{n-2} = m_{n-1} - \Delta m_{n-1}$$

$$\hat{c}1_{IIn} = a_{1II}\hat{c}1_{IIn-1} - a_{2II}\hat{c}1_{IIn-2} + G_{II}(b_{1II}m_{n-1} + b_{2II}m_{n-2})$$

$$a_{1II} = e^{-T/\tau 1_{II}} + e^{-T/\tau 2_{II}}$$

$$a_{2II} = e^{-T/\tau 1_{II}} \cdot e^{-T/\tau 2_{II}}$$

$\tau 1_{II}, \tau 2_{II}$ = Time Constants, Process II
$G_{II}$ = Process II Gain $$b_{1II} = (\tau 2_{II} - \tau 1_{II} + \tau 1_{II} e^{-T/\tau 1_{II}} - \tau 2_{II} e^{-T/\tau 2_{II}})/(\tau 2_{II} - \tau 1_{II})$$

$$b_{2II} = (((\tau 2_{II} - \tau 1_{II})e^{-T/\tau 1_{II}} \cdot e^{-T/\tau 2_{II}}) + \tau 1_{II} e^{-T/\tau 2_{II}} - \tau 2_{II} e^{-T/\tau 1_{II}})/(\tau 2_{II} - \tau 1_{II})$$

$$\hat{C}2_n = \hat{C}1_{n-NT}$$

$$N = \theta/T$$

$$\theta = \text{Dead Time}$$

From the foregoing description it will be apparent that the continuous in-line melt flow rate control system of the present invention has a number of advantages, some of which have been described above and others of which are inherent in the invention.

Also it will be apparent to those skilled in the art that modifications can be made to the control system of the present invention without departing from the teachings of the invention. Accordingly, the scope of the invention is only to be limited as necessitated by the accompanying claims.

We claim:
1. A method for controlling the molecular weight of a polymer being extruded through a die head at the outlet end of an extruder by altering, in a forward control manner, the mixture of degradent and polymer fed to the extruder relative to a target melt flow rate related to the molecular weight of polymer desired, said method comprising the steps of: monitoring the viscosity of a slip stream of melt from the extruder upstream from the die head; converting the monitored viscosity value to a process signal; comparing the process signal with a set point value related to a target melt flow rate; generating a correction signal when there is a difference between the process signal and the set point value; supplying said correction signal to a degradent additive feed control system for adjusting the amount of degradent added to the polymer fed to the extruder in response to the deviation of the process signal from the set point value; comparing the actual process signal with an approximated process model signal which includes at least one model for the process transition and a model for dead time; after the process transition and dead time periods have completely reacted to the correction signal, comparing the process signal with the set point value and if there is still a difference between the process signal and the set point value, generating a further correction signal and repeating the above thereby to maintain the melt flow rate as closely as possible to a target melt flow rate related to the desired polymer molecular weight.

2. The method of claim 1 wherein said process model signal includes a first process model and a second process model.

3. The method of claim 1 wherein said process model signal has a dead time of a few minutes up to 45 minutes or more.

4. The method of claim 1 wherein said degradent additive control system includes a feed forward control system including a polymer feed controller and a slave ratio controller for controlling the ratio of degradent mixed with the polymer feed.

5. The method of claim 1 including the further step of immediately comparing the correction signal with a predetermined process signal from the process transition model to indicate that a correction has been effected prior to the time the actual correction works its way through the extruder.

6. A method for continuously controlling the molecular weight of a polymer exiting a polymer mixing and extruding system by altering, in a forward control manner, the mixture of degradent and polymer fed to the extruder relative to a target melt flow rate related to the molecular weight of polymer desired, said method comprising the steps of: monitoring the viscosity of a slip stream of melt from the extruder upstream of an extruder die head with a rheometer having a positive pressure displacement pump; sensing a difference in the rheometer pump speed from the pump speed required to maintain a desired rate of flow of polymer at constant temperature and pressure through an orifice; altering the amount of degradent added to the polymer supplied to the mixing and extruding system in response to the sensed difference in speed of the pump; subsequently comparing the pump speed to the pump speed value required to maintain the desired rate of flow of the polymer at a constant temperature and pressure through an orifice after the altered ratio mixture of polymer and degradent has worked its way through the mixing and extruding system; and, if a difference in pump speed is sensed, repeating the above until the rate of flow of polymer at constant temperature and pressure through an orifice is substantially the desired rate of flow of polymer at constant temperature and pressure through an orifice related to the desired molecular weight of the polymer.

7. The method of claim 6 wherein said step of subsequently comparing the actual pump speed to a pump speed value which, for a constant temperature and pressure in the rheometer, will provide a desired melt flow rate includes the step of comparing the instantaneous pump speed and subsequent changing pump speed after the altered ratio mixture of polymer and degradent work through the mixing and extruding system to a process model signal for pump speed which includes at least one process model and a dead time model.

8. The method of claim 7 wherein said process model signal for pump speed includes first and second process models.

9. The method of claim 7 including the further step of immediately comparing the process model signal for the transition in pump speed with a correction signal used to alter the addition of degradent thereby to indicate that a correction has been effected prior to the time the actual correction works its way through the mixing and extruding system.

10. An apparatus for controlling the molecular weight of the polymer being extruded through a die head at the outlet of an extruder by altering, in a forward control manner, the mixture of degradent and polymer fed to the extruder relative to a target melt flow rate related to the molecular weight of polymer desired, said apparatus comprising: means for monitoring the viscosity of a slip stream of melt from the extruder upstream of the die head; means for converting the monitored viscosity value to a process signal; means for comparing the process signal with a set point value related to a target melt flow rate; means for generating a correction signal when there is a difference between the process signal and the set point value; means for supplying said correction signal to a degradent additive feed control system for adjusting the amount of degradent added to the polymer fed to the extruder in response to the deviation of the process signal from the set point value; means for comparing the actual process signal with an approximated process model signal which includes at least one model for the process transition and a model for dead time; means for comparing the process signal with the set point value after the process transition and dead time periods have elapsed and a steady state condition has been reached, and if there is still a difference between the process signal and the set point value, said apparatus being operable to generate a further correction signal thereby to maintain the melt flow rate as close as possible to the target melt flow related to the desired polymer molecular weight.

11. The apparatus of claim 10 wherein said process model signal includes a first process model and a second process model.

12. The apparatus of claim 10 wherein said degradent additive feed control system includes a feed forward control system including a polymer feed controller and a slave ratio controller for controlling the ratio of degradent mixed with the polymer feed.

13. Apparatus for continuously controlling the molecular weight of a polymer exiting a polymer mixing and extruding system by altering, in a forward control manner, the mixture of degradent and polymer fed to the extruder relative to a target melt flow rate related to the molecular weight of polymer desired, said apparatus comprising: means for monitoring the viscosity of a slip stream of melt from an extruder upstream of an extruder die head, said monitoring means including a rheometer having a positive pressure displacement pump; means for sensing a difference in the rheometer pump speed from the pump speed required to maintain a desired rate of flow of polymer at constant temperature and pressure through an orifice; means for altering the amount of degradent added to the polymer supplied to the mixing and extruding system in response to the sensed difference in speed of the pump and means for subsequently comparing the pump speed to the pump speed value required to maintain the desired rate of flow polymer at a constant temperature and pressure through an orifice after the altered ratio mixture of polymer and degradent has worked its way through the mixing and extruding system and for generating a correction signal if a difference in pump speed is sensed.

14. The apparatus of claim 13 wherein said comparing means for comparing the actual pump speed to a pump speed value which, for a constant temperature and pressure in the rheometer, will provide a desired melt flow rate, includes means for generating a process model signal for pump speed including at least one process model and a dead time model and said comparing means being operable to compare the instantaneous pump speed and subsequent changing pump speed after the altered ratio mixture of polymer and degradent rework through the mixing and extruding system to said process model signal.

15. The apparatus of claim 14 wherein said process model signal for pump speed includes first and second process models.

16. A mixing and extruding system for controlling the molecular weight of a polymer being extruded by altering, in a forward control manner, the mixture of degradent and polymer fed to the extruder relative to a target melt flow rate related to the molecular weight of polymer desired, said system including an extruder having an inlet for receiving a mixture of polymer, stabilizer and degradent for being extruded through a die head at the outlet end of said extruder, mixing means for mixing polymer, stabilizer and degradent prior to feeding same into the inlet end of said extruder, feeding means for feeding polymer, stabilizer and degradent in predetermined ratios to said mixing means and including ratio altering means, a rheometer, a slip stream conduit connection to said extruder upstream from said die head for supplying a stream of melt from said extruder to said rheometer, control means coupled to said rheometer and to said ratio altering means and including means for comparing the melt flow rate sensed by said rheometer to a target melt flow rate related to the desired polymer molecular weight and for altering the ratio in response to a change in the melt flow rate from the target melt flow rate.

17. The system of claim 16 wherein said rheometer is operable to maintain a substantially constant pressure and temperature at an outlet orifice thereof with the pump speed of a rheometer-positive-displacement pump varying in response to changes in viscosity of the melt and said control means including means for sensing the speed of said pump and for comparing said pump speed with a target pump speed which in conjunction with the constant temperature and pressure provides the desired melt flow rate, and said comparing means being operable to cause the ratio of said ratio altering means to be altered in response to a deviation in pump speed from the target pump speed to cause the pump speed to return to the target pump speed to produce the desired melt flow rate.

18. The system of claim 17 wherein said control means include a computer and said computer is programmed to compare the change in pump speed after the ratio of degradent to polymer has been altered, to a process model signal for the pump speed response including at least one process model and one dead time model.

19. The system of claim 18 wherein said process model signal includes first and second process models and the dead time model.

20. The system of claim 16 wherein said mixing means include first and second mixing apparatus.

21. The system of claim 16 wherein said mixing means include a feed forward control system for supplying polymer and degradent in a predetermined ratio to said inlet end of said extruder and wherein said control means include a melt flow rate controller coupled between the output of said rheometer and said feed forward control system, means for establishing a set point value related to said target melt flow rate and for supplying same to said melt flow rate controller which is operable to compare the set point value with a value corresponding to the measured melt flow rate and for operating said ratio altering means to cause the ratio of degradent mixed with the polymer to be altered in response to a deviation of the product melt flow rate from a desired melt flow rate as established by the set point value.

22. The system of claim 21 wherein said feed forward control system includes a feed controller for controlling the feed of polymer to said mixing means and said ratio altering means are defined by a slave ratio controller coupled to said feed controller and to a degradent feeder for controlling the ratio of degradent mixed with said polymer and wherein said melt flow rate controller is coupled to said ratio controller for changing the setting of said ratio controller to alter the ratio of the mixture of degradent and polymer in response to a change in the product melt flow rate as established by the set point value.

23. The system of claim 22 wherein said melt flow rate controller includes a set point comparator having one input for receiving the set point value and another input for receiving a process signal from the rheometer indicative of the product melt flow rate, a proportional-plus-integral calculator, a set point/process/model comparator having one input coupled to the output of said set point comparator and having an output coupled to said proportional-plus-integral calculator, a process model having an input and an output, the output from said proportional-plus-integral calculator being coupled to said feed forward control system and to the input of said process model, the output of said process model being coupled to the other input of said set point/process/model comparator, a dead time model and a model comparator, the output of said process model being supplied to said dead time model and the process model plus dead time model output signal being supplied to and compared by said model comparator with the actual process signal from said rheometer, and the output of said model comparator being supplied to said set point comparator.

24. The system of claim 23 including a filter between the output of said rheometer and said model comparator.

25. The system of claim 23 wherein said process model includes a process one model and a process two model, the output from said proportional-plus-integral calculator being supplied to the inputs of said process one and process two models and the outputs of said process one and process two models being supplied to a summing circuit, the output of said summing circuit being supplied to said dead time model.

* * * * *